United States Patent [19]

Lemaire

[11] 4,053,074
[45] Oct. 11, 1977

[54] DEVICE FOR HANDLING A VEHICLE-CARRIED CONTAINER

[76] Inventor: Pierre Lemaire, 5 Avenue des Frenes Vaux le Penil, 77000 Melun, France

[21] Appl. No.: 621,748

[22] Filed: Oct. 14, 1975

[30] Foreign Application Priority Data

Oct. 15, 1974 France .................. 74.34553
Feb. 18, 1975 France .................. 75.05017

[51] Int. Cl.$^2$ .................. B60P 1/64
[52] U.S. Cl. .................. 214/515; 214/77 R
[58] Field of Search .................. 214/77 R, 501, 515

[56] References Cited

U.S. PATENT DOCUMENTS

| | | | |
|---|---|---|---|
| 2,308,648 | 1/1943 | Devry et al. | 214/146.5 |
| 3,067,966 | 12/1962 | Hicks | 254/166 X |
| 3,202,305 | 8/1965 | Dempster et al. | 214/518 X |
| 3,819,075 | 6/1974 | Derain | 214/505 |
| 3,892,323 | 7/1975 | Corompt | 214/505 |

*Primary Examiner* — Frank E. Werner
*Assistant Examiner* — Lawrence E. Williams
*Attorney, Agent, or Firm* — Burgess, Ryan and Wayne

[57] ABSTRACT

A vehicle-mounted container-handling device for loading onto a vehicle a container located on the ground, and for performing the reverse operation. The said device comprises two arms, respectively an upper and a lower arm, perpendicular one with respect to the other. The outer end of the upper arm comprises prehension or hooking means for attaching onto a container. The lower arm is pivotally connected to a vehicle at a point close to a plumb line drawn from the said container center of gravity when the container is in its final resting position on the said vehicle; the said lower arm comprises two members, an upper member and a lower member, pivotally connected to each other. The said upper member comprises an abutment for sustaining the said upper member. The aggregate formed by the said upper and lower arms is moveable in a vertical and longitudinal plane with respect to the vehicle, from the rear to the front and vice-versa under actuation by a jack whose front end is connected to said vehicle, and whose rear end is pivotally connected to the upper member of a lower arm. The device enables the loading and unloading of a container from a vehicle in such a manner that the said container is subjected to a small angled inclination, and this is obtained by a comparatively small force, without causing a nose-lifting of the vehicle. A single hydraulic jack may be utilized to perform the above-mentioned operations.

4 Claims, 6 Drawing Figures

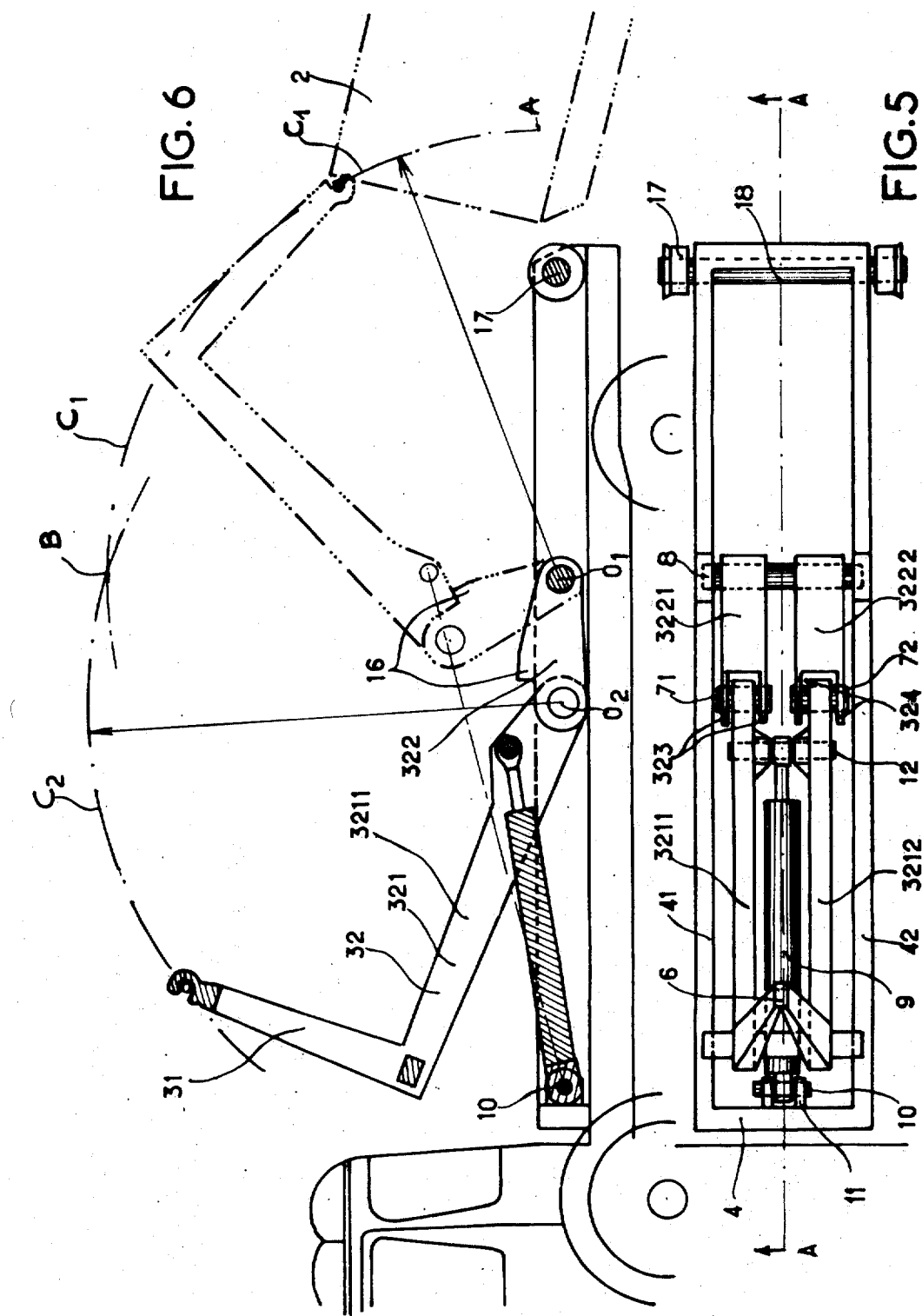

DEVICE FOR HANDLING A VEHICLE-CARRIED CONTAINER

The present invention concerns a device for handling a vehicle-carried container, allowing a container placed on the ground to be loaded onto a vehicle, and a container previously loaded onto a vehicle to be placed onto the ground.

Known devices of this kind comprise a right-angled lifting bracket located in a median plane of a vehicle; the upper arm of the lifting bracket, which is perpendicular to the lower arm, includes prehension or hooking means at one end, the said lower arm is articulted to the vehicle chassis and actuated by convenient means such as hydraulic jacks, the latter having their forward ends hinged to the front end of the vehicle chassis, and their rear ends hinged to the lower arm of the said lifting bracket in such a manner that the extension or the retraction of the hydraulic jacks causes the end of the said lifting bracket to move along an arcuate path in a vertical plane, either in one or the other two opposite directions.

In order to load onto a vehicle a container located on the ground, the said lifting bracket prehension means are engaged in a coupling ring provided at the front end of the said container; the hydraulic jacks are then actuated in such a manner that their retraction causes the said lifting braket to describe an arc, thus hoisting the said container in an inclined position until the said container attains a horizonal position on the said vehicle.

During this operation the front end of the container is lifted and its rear end slides on the ground until the longitudinal stiffeners provided at its base and constituting a cradle engage roller guides affixed to either side of the rear of the vehicle chassis. When this occurs, the right-angled lifting bracket continues its forward rotational movement, whereby the container is moved off the ground and tips forward over the said roller guides through the intermediary of said longitudinal stiffeners.

These known devices differ from other known container-handling devices comprising a lifting gantry pivotably connected to the rear of a vehicle chassis. The said latter container-handling devices must lift the total weight of a container, since the latter is lifted in a horizontal position. In these devices, the use of a gantry is mandatory, in order to prevent the container during the loading or unloading operations from being intercepted by the lifting system.

The container-handling device according to the present invention is basically different from the known devices, since it does not lift the total container weight, but only half of said weight. This advantage means lower dead weight, and allows larger containers to be used, since no gantry is required.

But, due to the fact that loading onto a vehicle is accomplished not by lifting the total weight of the said container, but by traction and by lifting the forward part of the said container, it follows that during the loading process, the said container is in an inclined position. In this connection, builders of container-lifting and container-handling devices have sought to provide equipment that would permit of a small angle of inclination during loading or unloading.

Known devices which endeavor to meet this requirement comprise, mainly, an angled bracket structure which is caused to slide within slideways, under actuation by an inner hydraulic jack, and which may cause the said angle bracket structure to move into, and out of, an arm articulated to the vehicle chassis, the said arm being actuated by two lateral hydraulic jacks.

In such latter known devices, loading a container aboard a vehicle takes place in two sequential phases; starting from its retracted position within the lower arm articulated to the vehicle chassis, the bracket structure, whose upper end is hooked to the front end of a container, is actuated, in a first sequential phase, by said lateral hydraulic jacks, which causes the said container to be slightly tilted. This phase ends when the container attains a horizontal position on the vehicle. In a second phase, the inner hydraulic jack, which actuates the bracket structure, causes the said container to move into its final resting position on the said vehicle.

Such latter devices are relatively heavy, and they are expensive to manufacture due to the fact that they require the use of three hydraulic jacks. Moreover, they are also fairly fragile because the sliding angle bracket structure is often subjected to high torsional forces, which results in frequent rupture of the system.

Furthermore, due to the strain and stress to which such devices are subjected, particularly at the beginning of the loading phase, it is necessary to utilize a rather heavy framework.

When long containers are handled, especially by means of semi-trailers, the above-described devices require a goose-neck structure. This, added to the fact that in this case four hydraulic jacks are utilized, leads to additional dead weight.

In another type of container-handling device, the lower arm of a right-angled bracket has two articulated members, comprising a lower and an upper member; both of the said lower and upper members are movable about an axis located near the opposite end at which the device is pivotally connected to the vehicle chassis; the rear end of a hydraulic jack is, in this case, affixed to the said lower member, and the said upper member may be rotated by the hydraulic jack by means of a complex system of levers and rods connecting the upper to lower members. This rotational movement causes the container, after attaining a horizontal position on the vehicle, to be drawn forward into its final position on the vehicle.

Such a device is difficult to manufacture, and the rods connecting the lower member to the upper member are subjected to considerable compressive stresses. In order to overcome problems arising therefrom, manufacturers of this type of device increase the dimensions of the parts to such an extent that the said device becomes incompatible with the low dead weight required in such systems.

The present invention aims at obviating the drawbacks inherent in the various types of vehicle-mounted container-handling devices above mentioned, by providing means for obtaining a simple vehicle-mounted container-handling device which is sturdier than those known heretofore, said device being less expensive to manufacture and adapted to be operated by a single hydraulic jack, while having a comparatively low dead weight.

The device which is the object of the present invention comprises a right-angled lifting bracket located in a median vertical plane on a vehicle, said right-angled lifting bracket having at least one upper arm and at least one lower arm, said lower arm being perpendicular to said upper arm, said bracket being provided at its free end with prehension or hooking means for attaching a container by its forward end; the lower arm which is perpendicular to said upper arm provided with said prehension means comprises two members i.e., an upper member and a lower member pivotally connected to each other. The lower member being, at its end opposite that which is connected to the upper member, pivotally connected to a horizontal transverse shaft carried by the chassis; and at least one hydraulic jack is pivotally connected by its forward end to said chassis and, by its rear end, to said lifting bracket.

According to the present invention, the pivotal connection between the upper member and each the lower member is substantially closer to the lower arm by which the lifting bracket is pivotally connected to the chassis, than it is to the opposite end of said lower arm; said horizontal transverse shaft mounted on said chassis, and about which the lifting bracket pivots, is located close to a vertical line comprising the said container center of gravity when the latter is in its final resting position on the vehicle; the hydraulic jack pivotally connected at its front end to the chassis, is pivotally connected at its rear end, to the upper member of each said lower arm of the lifting bracket; the lower member of said lower arm of the lifting bracket adapted to cooperate with said upper member.

Thus, due to the fact that the lower arm of the right-angled lifting bracket is constituted by two pivotally connected members, said right-angled lifting bracket may be folded over during approximately the first half of the loading process, which results not only in a low resistance to the retraction of the hydraulic jack, but also allows a reduced angle of inclination of the container to be obtained, while at the end of the loading process, by unfolding of the lifting bracket, the said container is placed in its final horizontal resting position in an adequate forward location on the vehicle.

The prehension or hooking means of said right-angled lifting bracket, instead of describing substantially a single arc of a circle whose center $O_1$ would be located at the point of pivotal connection between the right-angled lifting bracket and said chassis — (which would be a drawback in that excessive forces would be applied to the hydraulic jack, and in that the container would be tilted to too great an extent during loading) — is adapted, due to the fact that each said lower arm is articulated or pivotally connected into two members, to describe, in sequence, arcs $C_1$ and $C_2$ whose radii are considerably smaller than that of the above mentioned single arc. The arcs of circles $C_1$ and $C_2$ are virtually of the same length, and their respective centers $O_1$ and $O_2$ are located in vertical alignment with the center of gravity of the container when the latter is in its final resting position on the said vehicle.

More precisely, the loading of the container onto the said vehicle is accomplished in two sequential phases. During the first phase the entire right-angled lifting bracket pivots about the pivotal connection center $O_1$ on the said vehicle chassis; and, once the lower member of the lower arm of each said bracket which, up to this moment, supported the upper member by means of an abutment stop contacts the chassis, the assembly constituted by the upper arm of the bracket and the upper member of the lower arm pivots about the pivotal connection center $O_2$ between the upper member and the said lower member. During this phase, the prehension or hooking means located at the outer end of the bracket, describes in sequence, arcs about centers $O_1$ and $O_2$, respectively.

Ideally, arc of circle $C_1$ should have as small a radius as possible, compatible with an easy passage of the front end of the container above the rear end of the vehicle, this in order to reduce the force acting on the hydraulic jack.

Experience has shown that the problem presents itself differently according to whether short containers are loaded onto short vehicles, or whether long containers are loaded onto long vehicles.

In the first case, arcs or circles $C_1$ and $C_2$, respectively, have radii which are of approximately equal lengths, and their centers $O_1$ and $O_2$, respectively, are located at the same height above the ground.

In the second case, when longer containers are handled, obviously the length of the lower arm of the right-angled lifting bracket must be increased to enable the container to be displaced forwardly on the said vehicle, over a sufficient distance to ensure satisfactory loading conditions. In this case, in order to maintain the advantage of a small effort on each said hydraulic jack, at the beginning of the loading process — the heights of vehicle platforms being identical — it is necessary to increase the radius of arc of circle $C_2$ much more than that of arc of circle $C_1$. Thus, in the case where a very long container is handled by a device in accordance with the present invention, the said device, for example, structurally adapted to a semi-trailer, in order to avoid that the said container be tilted to too great an extent, the center of rotation $O_2$ must be moved downward with respect to center of rotation $O_1$, so that relatively to the ground said center of rotation $O_2$ is lower than center of rotation $O_1$.

Except for the difference proceeding from the fact that the said centers of rotation, respectively $O_1$ and $O_2$, are at different levels, operation of the system is similar, either when a device according to the invention is utilized to handle short containers, or when such a device is utilized to handle very long containers.

According to a preferred embodiment, with a view to allowing the device to be operated by a single jack, the lower member and the upper member of the lower arm of the lifting bracket are constituted each, at least in a zone adjacent to the pivotal connection of said two members, by two juxtaposed members separated from each other. This pivotal connection is then constituted by two pivotal connections connecting each one of the beams of the upper member to the corresponding beam of the lower member. The two pivotal connections are arranged in front of each other and are separated from each other. Thus, the rod of the jack which is arranged in the longitudinal axis of the device is enabled to move when the device is operated within the space which is thus defined between the beams of the lower member and the beams of the upper member.

In another embodiment the device according to the invention is actuated by means of two identical jacks which are juxtaposed on either side of the upper member. In this embodiment the lifting bracket is easier to manufacture, but, on the other hand, due to the fact that two jacks are used instead of a single jack with a view to produce the same lifting force the device will present a greater weight and will be more expensive, as each one of the two jacks will have to be comparatively large as compared to the single jack in the preceding embodiment; indeed, it must be remembered that the surface of the piston is proportional to the suare of the radius of the cylinder of the jack.

The appended drawings represent the device according to the present invention and are given by way of illustration, but not of limitation; the description hereinbelow refers to the said drawings.

FIG. 1 is a plane view of the container-handling device in the form of an embodiment comprising a single hydraulic jack, and is intended for the handling of comparatively long containers;

FIG. 2 is a sectional view of the same embodiment along line A—A of FIG. 1, at the same scale, in full-line drawing, showing the lifting bracket device in a position corresponding to the end of the second and last loading phase. The said FIG. 2 shows, in phantom-line drawing, a view in elevation of the said container-handling device at a moment when the lifting bracket is in a position corresponding to the beginning of the first loading phase. The same figure shows, in thin-line drawing, an elevation of the container-handling device with the lifting bracket in an intermediate position corresponding to the moment at which the container begins to bear down against the roller-guides.

FIG. 5 is a plane view of a container handling device having a single jack, adapted to be for used for handling comparatively short containers.

FIG. 6 shows, at the same scale, and in full-line drawing, a sectional view along A—A of FIG. 5, the container-handling device being in a position corresponding to the end of the second loading phase, and, in phantom-line drawing, a elevation of the container-handling device in a position corresponding to the beginning of the loading operation.

In the embodiment shown in FIGS. 1, 2, 3 and 4 the device according to the invention is mounted on a semitrailer.

In the embodiment represented in FIGS. 5 and 6, the device according to the invention is mounted on a truck.

The embodiment of the container-handling device provided with a single jack, intended for the handling of comparatively long containers shall first be described. However, as has already been pointed out, this description applied as well, in its essentials, to a container-handling device comprising a single hydraulic jack, which is adapted to be used for handling comparatively short containers, the sole difference being variation of the height of the pivotal connection between the lower member and the upper member of the lifting bracket above the ground.

Figure 3:
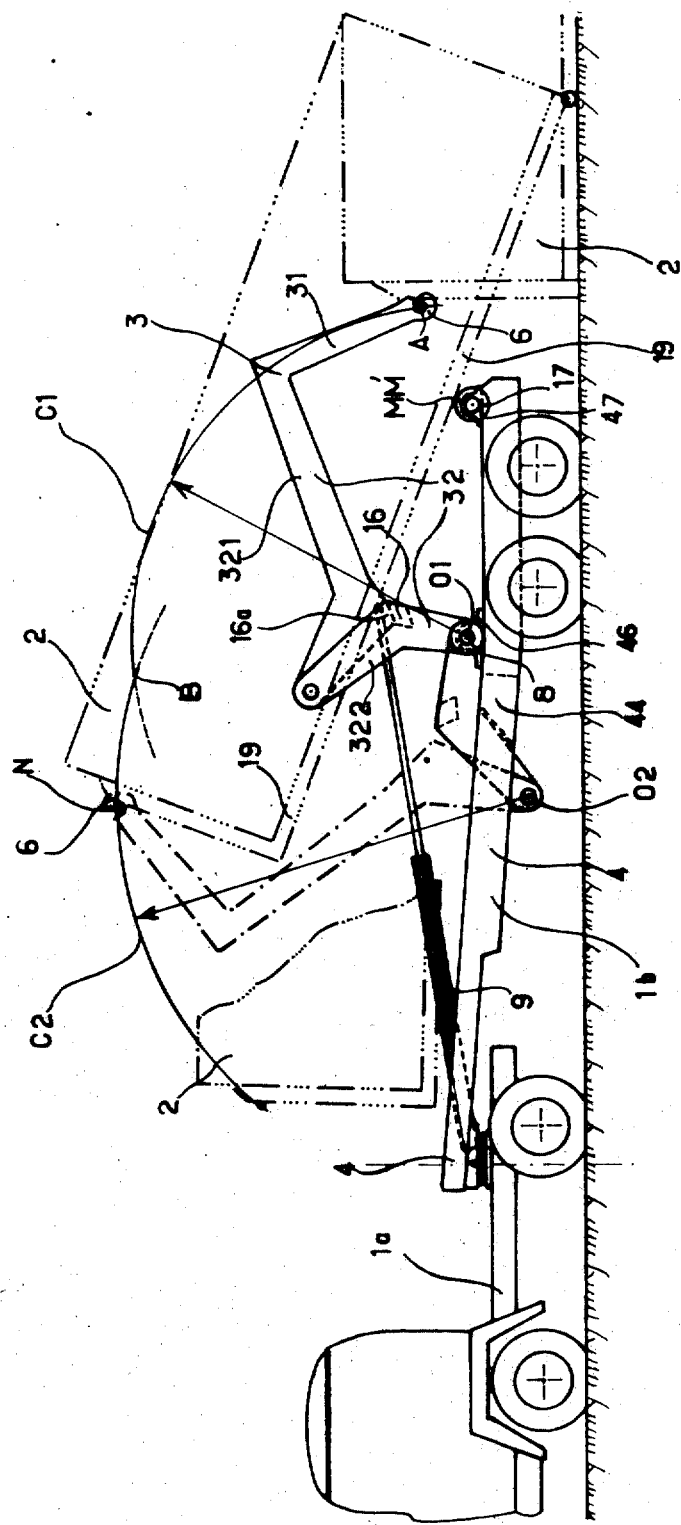
FIG. 3 shows, at a reduced scale, the container-handling device of FIGS. 1 and 2 in its entirety.

As shown in FIG. 3, the described assembly is constituted by a tracting vehicle 1a and a semi-trailer 1b. The container-handling device is mounted on the semitrailer 1b.

Figure 1:
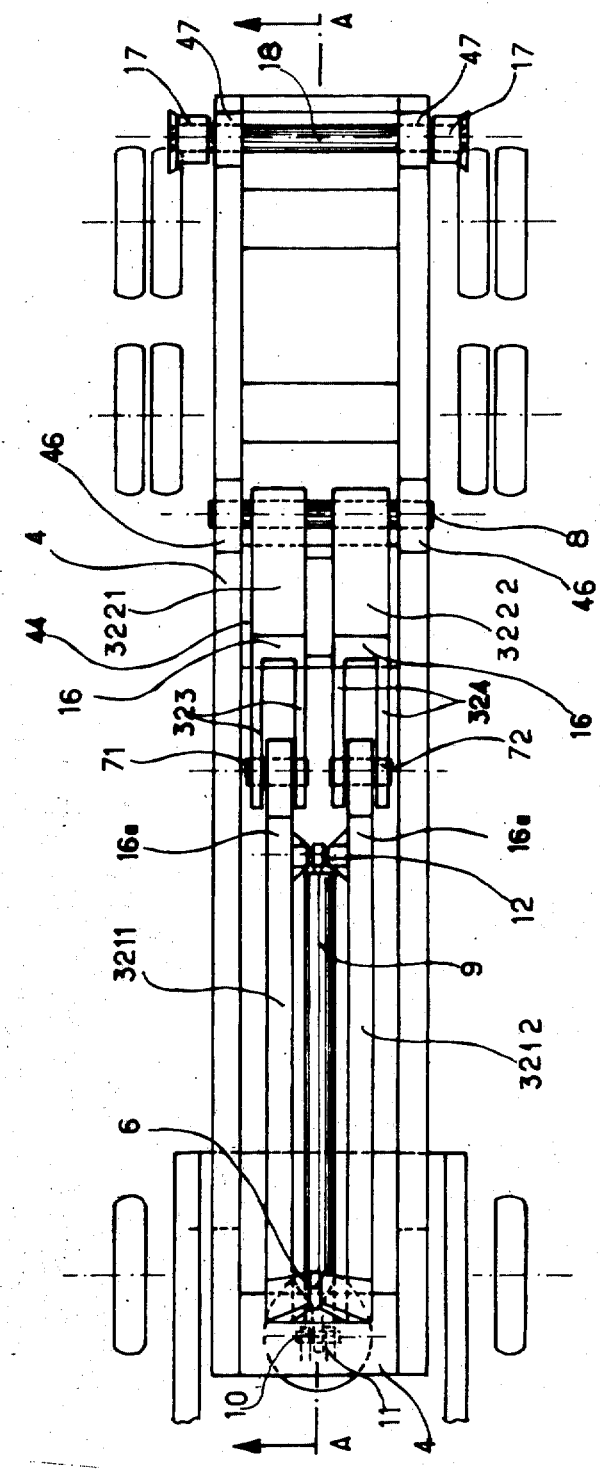
Figure 2:
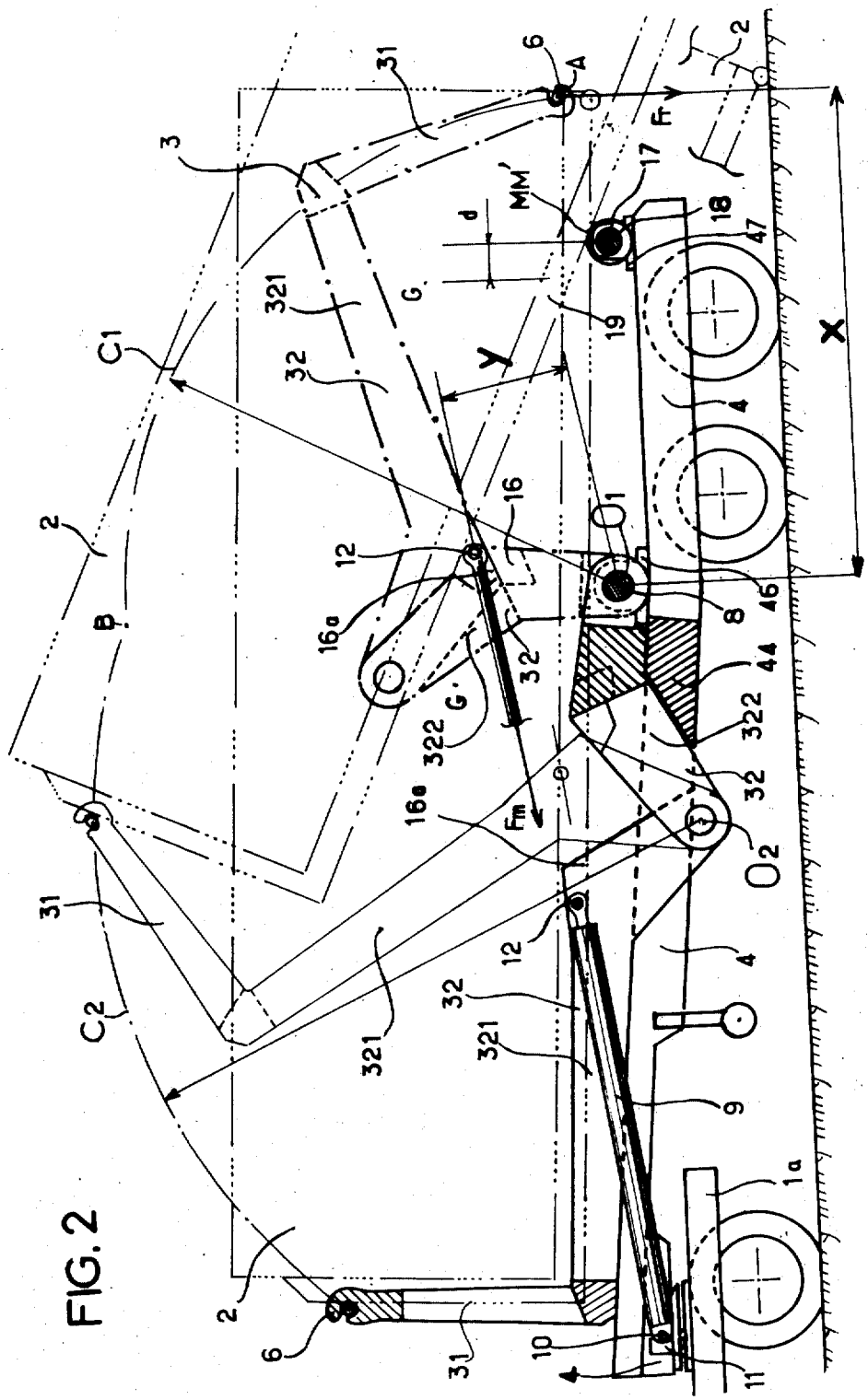

FIGS. 1 and 2 show that the vehicle-mounted container-handling device comprises a lifting bracket 3 pivotally connected to the chassis 4 of a semi-trailer by means of a shaft 8 mounted on two bearings 46 connected to the chassis. The upper arm 31 of each rightangled arm comprises a triangular forcing part provided with prehension or hooking means 6. The lower arm 32 of the bracket comprises an upper member 321 and a lower member 322 pivotally connected to each other.

As shown in FIG. 1, the upper member comprises two beams 3211, 3212; said beams are juxtaposed side by side. The lower member comprises two beams 3221, 3222; said beams are juxtaposed, too, side by side. Beam 3211 is pivotally connected to beam 3221, and beam 3212 is pivotally connected to beam 3222. The two points of pivotal connection, respectively 71 and 72, are separated from each other and are coaxial with respect to each. In the vicinity of each of the pivotal connections, beams 3211 and 3221, respectively, are without contact with respect to beams 3212 and 3222, respectively, so that the rod of the jack has sufficient space in which to move during operation of the lifting bracket arms.

The lower member 322 is pivotally connected to shaft 8 through beams 3221, 3222, said shaft 8 being supported by supports 46 mounted on chassis 4.

An important feature of the invention consists in the fact that each member 321 and 322, respectively, of the lower arm of the lifting bracket, is angled, so that each said member, in a resting position under the said container once the latter has been placed onto a vehicle, comprises a part which is substantially parallel to the bottom of the said container, and a part inclined towards the ground, the said part which is inclined towards the ground, ending on the point of pivotal connection between the upper member and the lower member, as shown from the full-line drawing in FIG. 2.

In addition, each beam 3221 and 3222, respectively, of the lower member 322 of the lower lifting bracket arm comprises an abutment or stop member 16 located at the rear of the pivotal connection point of the upper lifting bracket member. Each abutment 16 links the vertical parallel faces 323 and 324 constituting the respective ends of the beams (FIG. 1) of the lower member, and between which the corresponding beam of the upper member is able to move when the device is actuated. These abutments are adapted, too, to receive the corresponding lower portion 16a of said beams of the upper bracket member.

A hydraulic jack 9, operated by the hydraulic system provided on the tractor vechicle 1a, for example, is mounted between beam of the upper bracket member 321, and is pivotally connected at its forward end to shaft 10, said shaft being mounted on chassis 4 of the semi-trailer by means of yokes 11, provided on the chassis; the rear end of said hydraulic jack 9 is pivotally connected to shaft 12 connecting beams 3111 and 3212 of the upper member 321 of the lower bracket arm 32.

The chassis 4 of the semi-trailer comprises at its rear end two roller-guides 17 carried by shaft 18, which is mounted on the chassis by means of bearings 47.

The sequential operations that may be performed by means of the container-handling device according to the invention shall now be described, commencing with the operation of loading the said container aboard a vehicle, and for which is referred now to FIG. 3, which shows a container 2 on the ground. Prehension or hooking means 6 is engaged in the container attachment, the said prehension or hooking means 6 being in position A.

It is important to note (FIG. 2) that, prior to actuating hydraulic jack 9 so as to retract its shaft, due to the particularity that each right-angled lifting bracket is folded over onto itself, which is obtained by each lower arm 32 being divided into two members, each respectively 321 and 322, the distance X — of resistive force FR produced by the weight of the said container on prehension or hooking means 6 — to the axis of rotation 8 of the lifting bracket on the said vehicle chassis, is relatively small with respect to the said distance prevailing on known container-handling devices.

Also, due to the same particularity, the articulation or point of pivotal connection 12 where the hydraulic jack shaft actuated end joins each said lower arm 32, is located in a position corresponding approximately to a vertical or plumb line joining the said articulation or point of pivotal connection and the articulation or point of pivotal connection of the bracket to the said vehicle chassis, the lower member of the lower arm of the lifting bracket being approximately in a vertical position, so that the distance Y of the line of action of the tractive force FM applied by the said jack to the axis of rotation 8 of the lifting bracket is relatively large with respect to that existing on known container-handling devices.

Thus, at the beginning of the first sequential loading phase, FM equals $(X/Y) \times FR$, for a given resistant force FR, X being relatively small and Y being relatively large, the motive power FM required, applied by the said hydraulic jack, is, reltively speaking, a fortiori much smaller than on known container-handling devices.

Reference is now made to FIG. 3 and the container-loading operation onto a vehicle.

Hydraulic jack 9 is actuated so as to cause retraction of its shaft. In a first sequential phase, bracket 3 pivots about transverse shaft 8, integral with chassis 4, in a direction which raises the prehension or hooking means. The said prehension or hooking means describe, beginning at point A, an arc of circle C1 whose center 01 is located on the same said transverse shaft 8, whereby the said container 2 is dragged until the beams of the lower members of the lower arm of the bracket, as may be seen from FIGS. 2 and 3, come to rest with their front faces on the retaining crosspiece 44 of the said chassis of a semi-trailer. The said prehension or hooking means are, at this point, in position B, and the second sequential loading phase commences.

One may note from FIGS. 2 and 3 that, as the shaft of the said hydraulic jack continues to be retracted, the upper member 321, which, up to this moment, rested on abutment stop or prop 16 of the lower member 322, by means of their respective rear faces 16a, now leaves these abutment stops or props, and the said prehension or hooking means 6 of bracket 3 describes another arc of circle C2 whose length is substantially equal to that of the arc of circle C1, and whose center 02 is located on the axis of articulations or points of pivotal connection 71 and 72, respectively (FIG. 1), which connect the beams of the upper member 321 to the beams of the lower member 322.

When prehension or hooking means 6 (FIG. 3) of the bracket reaches position N, the total weight of container 2 rests, by means of longitudinal stiffeners 19, on two roller-guides 17 located at the respective opposite ends of the shaft 18 which rests on bearings 47 integral with the rear end of the chassis of the semi-trailer.

If, at this moment, a vertical line is drawn downwards from the center of gravity of the said container, as may be seen from FIG. 2, it may be noted that the said vertical line passes in front of the point of contact MM' between said longitudinal stiffeners 19 and said roller guides 17, the effect being that a nose-lifting of the said vehicle chassis of the semitrailer is rendered practically impossible.

It is worth noting that radius of arc of circle C2 is greater than radius of arc of circle C1. However, the difference in the lengths of the radii of arcs of circles C2 and C1, respectively, is here much greater than is the difference which exists between the radii of the same said arcs of circles C2 and C1 of the container-handling device to be used for handling shorter containers, as may be seen on FIG. 6.

This is due to the fact that in the present case, there is a greater container length to be positioned in a final resting position on said semi-trailer, as well as to the fact that, in both cases, the optimal container trajectory at the beginning of the loading phase differs very little, the vehicle rear ends being practically at the same heights.

Thus, in order to prevent the arcuate trajectory C2 of the prehension or hooking means 6 from attaining too great a height, with respect to the trajectory previously referred to, defined by arc of circle C1 (which would result in excessive tilting of the container during loading of the said container onto the said vehicle) and yet allow said arcuate trajectory C2 to attain a height of sufficient amplitude to ensure avoiding nose-tilting of the said vehicle, one is led to lower the center of arc of circle C2 with respect to arc of circle C1, and this results in said center 02 being closer to the ground than is said center 01.

The second and last loading phase ends when, as is indicated in FIG. 2, the bracket comes to rest on the said vehicle chassis.

Unloading of the said container from the said vehicle is carried out according to the same aforementioned phases, but in reverse order.

The container-handling device used in handling shorter containers, is identical in operation to that which has just been described. The following remarks are, nonetheless, in order :

On FIG. 6 it may be noted, that centers, respectively 01 and 02 of arc of circles C1 and C2 respectively, are substantially at the same height with respect to the ground and that radius of arc of circle C2 is slightly larger than that of arch of circle C1, so that the trajectory of arc of circle C2 reaches a greater height than the trajectory of arc of circle C1. These differences are usually necessary, in order to avoid nose-lifting of the vehicle when the container, through means of its longitudinal girders, comes in contact at point M with the said roller-guides located to the rear of the said vehicle. When contact is established at point M, distance d of the verticals or plumb lines lowered from said point M and from center of gravity G of the container, must be comparatively small in order to avoid nose-lifting of the said vehicle chassis about its rear axle.

This kind of risk is considerably reduced when a container-handling device is used for handling long containers, for in such a case, maximum heights of trajectories of arcs C1 and C2 may be substantially identical.

A description of the container-handling device in its version provided with two hydraulic jacks follows, wherein operation of the system is identical to that of the preceding version. The description shall be limited to the version used in handling very long containers; the said operative example being identical to that utilized for handling shorter containers.

Figure 4:
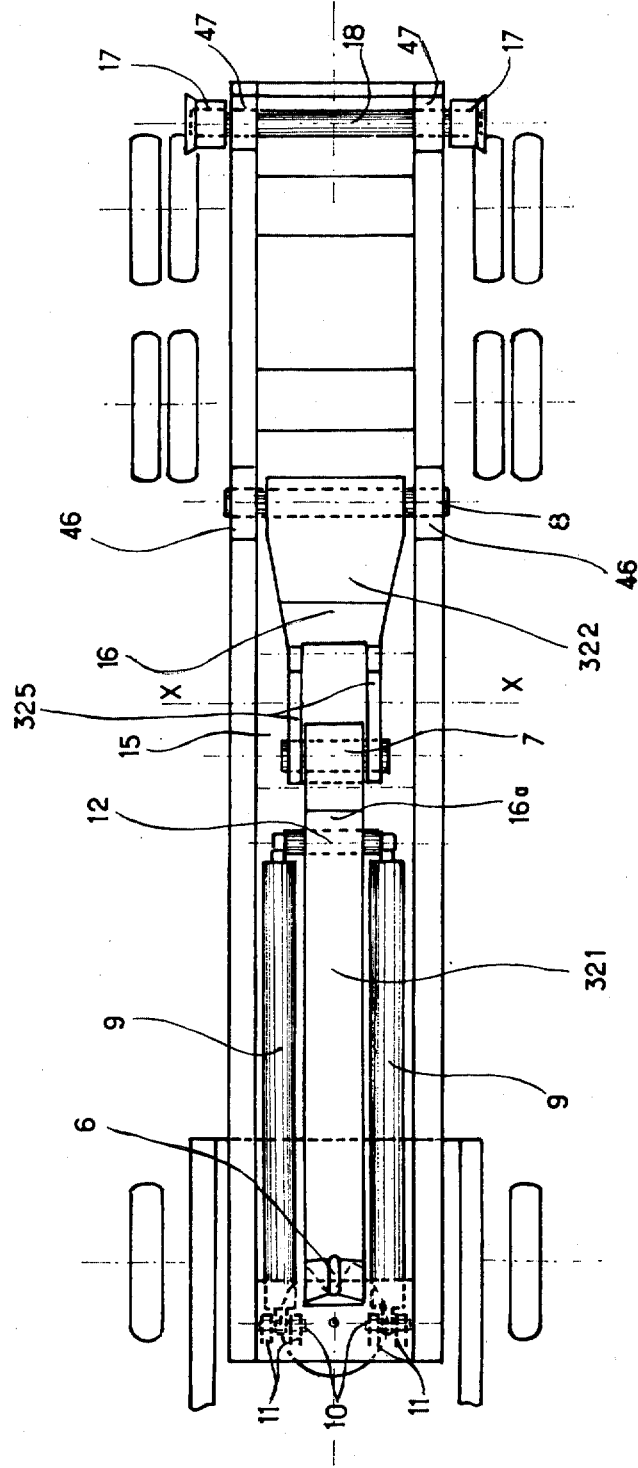
FIG. 4 shows, at the same scale as that of FIGS. 1 and 2, a plane view of a container-handling device according to the invention, comprising two hydraulic jacks and adapted to be used for handling comparatively long containers.

FIG. 4 shows two identical jacks 9 located one on each side of upper member 321 of lower arm 32. Each of the said jacks is articulated or pivotally connected by one end about each shaft 10 held by yokes 11, integral with chassis 4; and, to a common shaft 12, which is integral with member 321.

Member 321 is articulated or pivotally connected to member 322 by means of shaft 7, said shaft being retained to yokes 325 which is part of member 322.

Yokes 325, according to a sectional view along axis XX', is of U-form, with an opening at its top. This allows upper member 321 to have rotational amplitude of sufficient magnitude, in relation to lower member 322, and said upper member 321 may be housed in lower member 322 by propping against abutment stop or prop 16, by means of part 16a of upper member 321.

Said lower member 322 is articulated or pivotally connected to shaft 8, said shaft being carried by supporting elements 46 affixed to the said vehicle chassis. Operation of the system according to the present version is similar in all other respects to that of the system according to the version previously described.

Comparing FIGS. 1 and 4, it may be seen that when two hydraulic jacks are utilized instead of one, the drawback thereby created is compensated by the advantage obtained through the use of a more simplified structure of the said lower and upper members.

The advantage which is obtained by the use of the characteristic structure of the lower arm of the bracket or, respectively, of the twin parallel juxtaposed right-angled lifting arms in the specific embodiment wherein it is utilized as mounted on a semi-trailer is worthy of underlining. Indeed, either a single jack, or several jacks, may be located far forward of the semi-trailer chassis without the stroke being increased; this allows attaching of the jack or jacks, as the case may be, by its or their respective forward end or ends, at a point located on a vertical or plumb line, or at least at a point very close to the articulation or pivotal connection axis and the connection point of the front of the semi-trailer to the tracting vehicle, as appears in FIGS. 2 and 3. Thus the reaction efforts of the hydraulic jack, or jacks, as the case may be, on the said semi-trailer chassis frame, take place under optimum conditions, and this allows lightening of the said semi-trailer chassis frame.

What is claimed is:

1. A device mounted on a generally horizontal supporting structure of a vehicle for loading and unloading a container on and off said vehicle, said device comprising:
   a transverse horizontal shaft mounted on said structure substantially intermdiate the length of the vehicle and perpendicular to the longitudinal axis of the vehicle;
   a lifting bracket having a rigid upper arm and an articulated lower arm secured thereto, the free end of said upper arm having prehension means for engaging a forward end of a container, said lower arm comprising (i) a rigid unitary upper member having a major portion perpendicular to said upper arm, one end of said upper member adjacent said major portion being rigidly affixed to the other end of said upper arm, and (ii) a lower member having first and second portions angled with respect to each other, a first end adjacent said first portion and pivotally connected to the other end of said upper member adjacent a minor portion of said member, said major and minor portions of said upper member being angled with respect to each other, said lower member having a second end adjacent said second portion thereof and connected to said shaft for pivotal movement of said lower member with respect to said supporting structure,
   said bracket being situated in the median plane of said vehicle, and having a rest position and an extended position with respect to said structure;
   at least one control jack connected between said supporting structure and a point on said upper member adjacent the boundary between said major and minor portions thereof, for moving said bracket between said rest and extended positions,
   said bracket being disposed in said rest position with said major portion of said upper member and said second portion of said lower member substantially horizontal, and said minor portion of said upper member and said first portion of said lower member angled downward; and said second portion of said lower member being substantially vertical in the extended position of said bracket.

2. The device according to claim 1, wherein, when said hydraulic jack shaft is at maximum extension, and when the entire lifting bracket is thus in a position corresponding to the beginning of the container-lifting operation, said lower member of said lower arm of said lifting bracket is in a substantially vertical position.

3. The device according to claim 1, wherein, when said container is in its final resting position on said vehicle and when said lower and upper members of said lower arm of the lifting bracket are in their final resting position under said container, the point of pivotal connection between said upper member and said lower member is located at a level lower than the level of the point of pivotal connection between said lifting bracket and said chassis.

4. The device according to claim 1, wherein said lower member and said upper member are angled in such a manner that when said lower and upper members are in their final resting position under the said container, each one of said members comprises a part which is substantially parallel to the bottom of said container, and a part which is inclined towards the ground, said parts being joined at the points of pivotal connection between said lower and upper members.

* * * * *